US012619687B2

(12) United States Patent
Fontaine et al.

(10) Patent No.: US 12,619,687 B2
(45) Date of Patent: May 5, 2026

(54) SECURE SOFTWARE LIFE DURATION TIMER

(71) Applicant: InvenSense, Inc., San Jose, CA (US)

(72) Inventors: Aurelie Fontaine, Grenoble (FR); Remi Buisson, Grenoble (FR)

(73) Assignee: InvenSense, Inc., San Jose, CA (US)

( * ) Notice: Subject to any disclaimer, the term of this patent is extended or adjusted under 35 U.S.C. 154(b) by 290 days.

(21) Appl. No.: 18/238,115

(22) Filed: Aug. 25, 2023

(65) Prior Publication Data

US 2025/0068704 A1     Feb. 27, 2025

(51) Int. Cl.
| | |
|---|---|
| *G06F 21/12* | (2013.01) |
| *G06F 8/61* | (2018.01) |
| *G06F 21/10* | (2013.01) |

(52) U.S. Cl.
CPC .............. *G06F 21/121* (2013.01); *G06F 8/61* (2013.01); *G06F 21/107* (2023.08)

(58) Field of Classification Search
CPC ......... G06F 21/121; G06F 21/107; G06F 8/61
See application file for complete search history.

(56) References Cited

U.S. PATENT DOCUMENTS

| | | | |
|---|---|---|---|
| 5,708,709 | A | 1/1998 | Rose |
| 6,072,871 | A | 6/2000 | Ur |
| 6,931,548 | B2 | 8/2005 | O'Connor |
| 7,561,598 | B2 | 7/2009 | Stratton et al. |
| 7,934,196 | B2 | 4/2011 | Ikeda et al. |

| | | | |
|---|---|---|---|
| 8,127,351 | B2 | 2/2012 | Takagi et al. |
| 8,533,708 | B2 | 9/2013 | Kamada et al. |
| 9,020,921 | B2 | 4/2015 | Alber et al. |
| 9,626,667 | B2 | 4/2017 | Boccon-Gibod et al. |
| 11,010,483 | B1 | 5/2021 | Linga et al. |
| 12,190,096 | B2 * | 1/2025 | Tsujioka .................. G06F 8/65 |
| 2003/0033525 | A1 * | 2/2003 | Rajaram .............. H04W 12/08 |
| | | | 713/168 |
| 2006/0155652 | A1 | 7/2006 | Colby |
| 2007/0239730 | A1 * | 10/2007 | Vigelette ................ G06F 21/31 |

(Continued)

OTHER PUBLICATIONS

Cheng, H.K. et al., "Optimal Software Free Trial Strategy: Limited Version, Time-locked, or Hybrid?", Production and Operations Management, vol. 24, No. 3, pp. 504-517, Mar. 2015.

(Continued)

*Primary Examiner* — Kristie D Shingles
(74) *Attorney, Agent, or Firm* — DLA Piper LLP (US)

(57)     ABSTRACT

An example embodiment includes an example embodiment includes a method performed by a processor of a user device. The method including receiving, by the processor of the user device, instructions for installing application software on the user device, and installing the application software on the user device based on the instructions. The installation including installing library code of the application software in a section of a memory device of the user device and installing timer code in the section of the memory device along with the library code. The erasure of the timer code from the memory device causes erasure of the library code from the memory device. Decrementing, by the processor of the user device, the timer code when the processor executes the library code, the timer code limiting a life duration of the user device executing the application software.

18 Claims, 6 Drawing Sheets

(56) References Cited

U.S. PATENT DOCUMENTS

| | | | |
|---|---|---|---|
| 2012/0079245 A1* | 3/2012 | Wang | G06F 8/52 |
| | | | 712/228 |
| 2013/0283396 A1 | 10/2013 | Langer et al. | |
| 2015/0370560 A1* | 12/2015 | Tan | G06F 9/323 |
| | | | 717/148 |
| 2018/0096140 A1* | 4/2018 | Bulygin | G06F 21/52 |
| 2018/0191807 A1* | 7/2018 | Dawes | H04L 12/2803 |
| 2019/0332519 A1* | 10/2019 | Myers | G06F 11/3636 |
| 2024/0320041 A1* | 9/2024 | Halageri | G06F 9/4887 |

OTHER PUBLICATIONS

Wilson, J., "Prevent Time-Based Copy Protection Circumvention?", Stack Overflow, Sep. 2009.

* cited by examiner

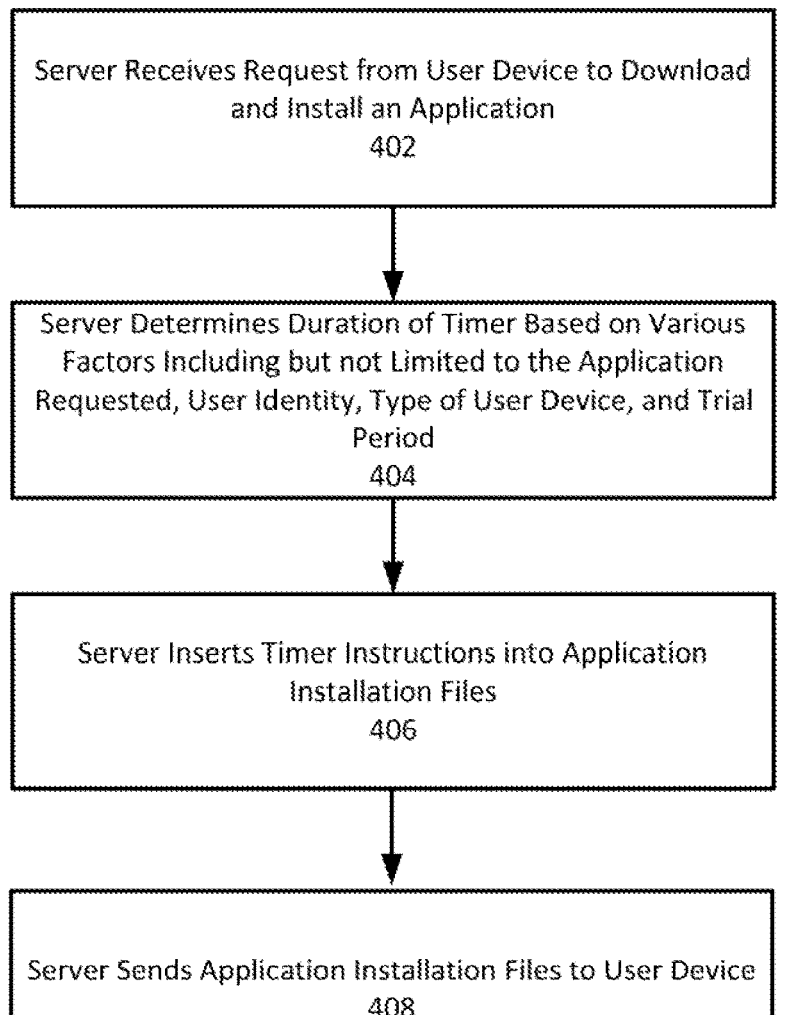

Server Receives Request from User Device to Download and Install an Application
402

Server Determines Duration of Timer Based on Various Factors Including but not Limited to the Application Requested, User Identity, Type of User Device, and Trial Period
404

Server Inserts Timer Instructions into Application Installation Files
406

Server Sends Application Installation Files to User Device
408

FIG. 4

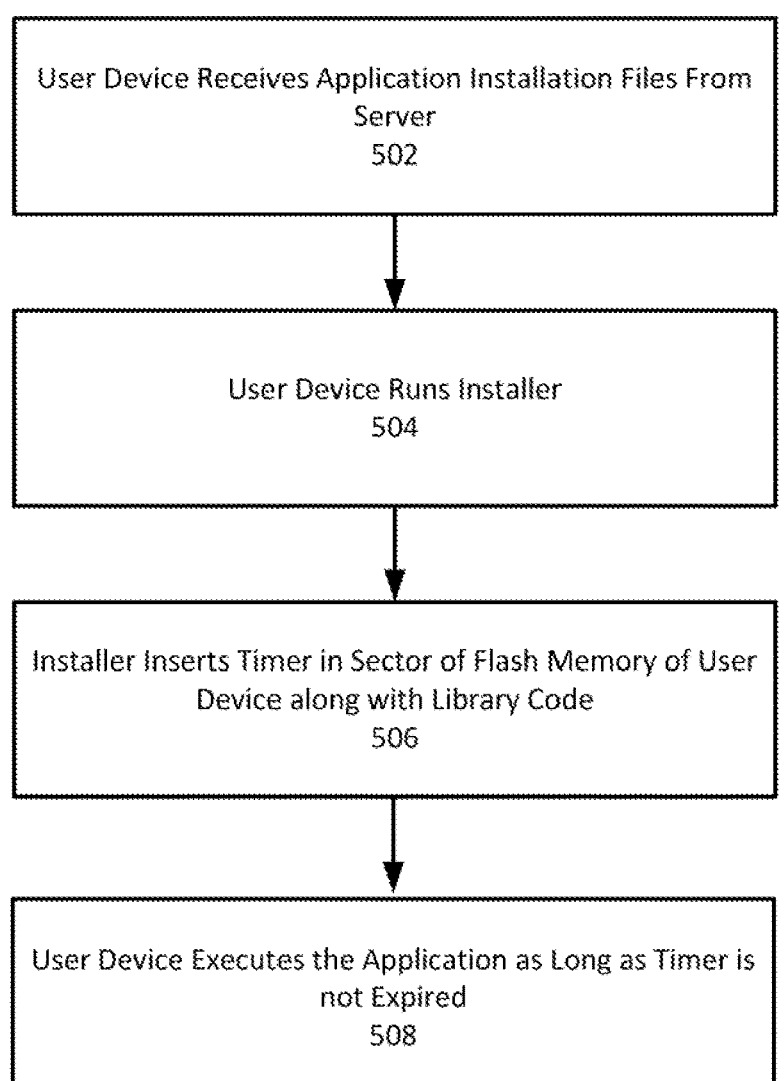
User Device Receives Application Installation Files From Server
502
User Device Runs Installer
504
Installer Inserts Timer in Sector of Flash Memory of User Device along with Library Code
506
User Device Executes the Application as Long as Timer is not Expired
508
FIG. 5

```
                    ┌─────────────────────────────┐
                    │      Execute Application     │
              ┌────▶│             602              │
              │     └─────────────────────────────┘
              │                    │
              │                    ▼
              │              ◇─────────────◇
       No     │             Library in Use?
  ◀───────────┤                 604
              │              ◇─────────────◇
              │                    │ Yes
              │                    ▼
              │     ┌─────────────────────────────┐
              │     │       Decrement Timer        │
              │     │             606              │
              │     └─────────────────────────────┘
              │                    │
              │                    ▼
       No     │              ◇─────────────◇
  ◀───────────┤              Timer Expired?
                               608
                            ◇─────────────◇
                                 │ Yes
                                 ▼
              ┌─────────────────────────────────────────┐
              │  Prevent User Device from Executing      │
              │  Application and Notify User that Timer  │
              │  is Expired                              │
              │                  610                     │
              └─────────────────────────────────────────┘
```

SECURE SOFTWARE LIFE DURATION TIMER

FIELD

A system and method for implementing a secure software life duration timer.

BACKGROUND

Conventional software life duration timers are used by software companies to set a predetermined permitted duration of time that the end user is able to execute a software application. For example, this predetermined duration of the timer may be set based on a trial period or license period of the software application. However, these conventional software life duration timers are susceptible to tampering where the end user is able to reset or freeze the timer so that it doesn't expire, thereby allowing the end user to utilize the software application beyond the predetermined permitted duration.

SUMMARY

An example embodiment includes a method performed by a processor of a user device. The method including receiving, by the processor of the user device, instructions for installing application software on the user device, and installing the application software on the user device based on the instructions. The installation including installing library code of the application software in a section of a memory device of the user device, and installing timer code in the section of the memory device along with the library code. The erasure of the timer code from the memory device causes erasure of the library code from the memory device. Decrementing, by the processor of the user device, the timer code when the processor executes the library code, the timer code limiting a life duration of the user device executing the application software.

An example embodiment includes a method performed by a processor of an application software device. The method including creating, by the processor of the application software device, instructions for installing application software on a user device. The instructions instructing the user device to install library code of the application software in a section of a memory device of the user device, install timer code in the section of the memory device along with the library code, where the erasure of the timer code from the memory device causes erasure of the library code from the memory device, and decrement the timer code when the user device executes the library code, where the timer code limits a life duration of the user device executing the application software. Providing the instructions to the user device for facilitating installation of the application software on the user device.

BRIEF DESCRIPTION OF THE DRAWINGS

So that the manner in which the above recited features of the present disclosure can be understood in detail, a more particular description of the disclosure, briefly summarized above, may be had by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 4 shows an illustration of a flowchart for creating the timer, according to an example embodiment of the present disclosure.

FIG. 5 shows an illustration of a flowchart for installing the timer, according to an example embodiment of the present disclosure.

FIG. 6 shows an illustration of a flowchart for decrementing the timer, according to an example embodiment of the present disclosure.

DETAILED DESCRIPTION

Figure 1:
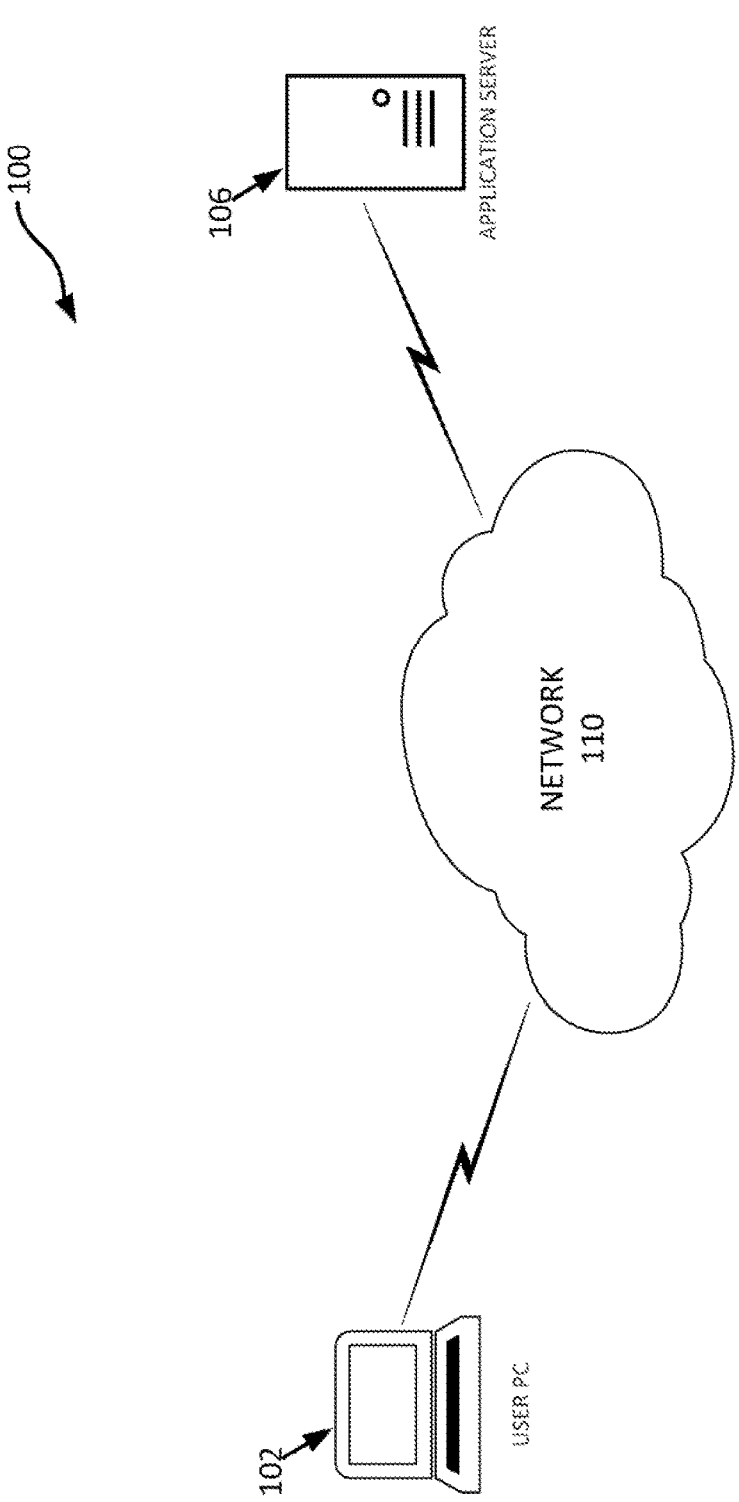
FIG. 1 shows an illustration of an overall network diagram of the system, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

In today's software environment, software companies typically provide end users with access to software applications for a predetermined time duration (herein "permitted time duration"). This time duration may coincide with a trial period or a license period of a software application. The permitted time duration may limit the use of the entire software application or just certain features of the software application. In either case, software companies would benefit from a simple and secure mechanism to set the permitted time duration such that the end user is able to execute a software application while not being able to manipulate (e.g., hack) the mechanism to gain additional time to execute the software application.

Examples of a secure software life duration timer, herein referred to as the "timer" are described below. The examples shown in the figures and described herein are directed to a timer code that is installed in the same section of memory on the device as a portion of the library code of the application software. For example, if the memory is a flash memory device, the timer code is installed in the same "sector" of flash memory as the library code of the application software.

With this configuration, if the end user attempts to reset the timer, the library code in the same sector of flash memory will be destroyed, thereby rendering the software application or a feature of the software application useless. In other words, storing the timer code in the same section of memory as the library code protects the timer from manipulation. Although flash memory is described herein as being the medium for storing the timer code and library code, it is noted that the solution not limited to flash memory but may be implemented in any memory where manipulation of the timer code destroys the library code.

The disclosure herein provides various benefits including but not limited to a simplistic and secure manner of implementing a software life duration timer. For example, the timer can easily be installed in the memory of the user device upon installation of the software application. The timer places a time restriction (permitted time duration) on the use of protected library code. The timer generally decrements as the protected library code is being utilized by the user device. During operation, the software compares the timer value to a threshold. When the timer expires, the software prevents the end user for utilizing the protected library code which may correspond to the entire software application or a portion (i.e., specific feature) of the software application. If during this permitted time duration, the end user attempts to reset the timer to additional use of the application, the memory device will automatically destroy the protected library code rendering the software unusable. For example, the timer and the library code may be stored in the same sector (e.g., 4 KB) of flash memory. This static flash memory sector cannot be partially erased or written over. Therefore, if the end user attempts to erase or write over a portion of the sector (e.g., change the timer code), the entire sector will be erased. In other words, a bad actor (e.g., the end user) cannot reset the timer without the memory automatically wiping the library code that is stored in the same sector.

FIG. 1 shows an example of a system 100 configured for providing one or more software application(s) including secure software life duration timers. It is understood that the components of the system 100 shown in FIG. 1 and described herein are examples and systems with additional, alternative, or fewer number of components should be considered within the scope of this disclosure.

As shown, system 100 comprises at least one user device and at least one server 106 (application software device) interconnected through a network 110. In the illustrated example, server 106 supports operation and installation of one or more software application(s) on user device 102. In the illustrated example, user device 102 is a PC but may be any device (e.g., smartphone, tablet, etc.) providing access to the servers via network 110. User device 102 has a user interface UI, which may be used to communicate with the server using the network 110 via a browser or via software applications. For example, user device 102 may allow the user to download a software application provided by server 106. The network 110 may be the Internet and or other public or private networks or combinations thereof. The network 110 therefore may include any type of circuit switching network, packet switching network, or a combination thereof.

Server 106 and user device 102 are each depicted as single devices for ease of illustration, but those of ordinary skill in the art will appreciate that servers 106 and user device 102 may be embodied in different forms for different implementations. For example, the server may include a plurality of servers. Alternatively, the operations performed by the server may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 1 may be a system that supports the functionality of downloading, installation and operation of the software application.

In one example, user PC 102 may not be in communication with application server 106, but rather may be a standalone PC that is able to install the software application via local means such as non-transitory computer readable medium devices such as flash memory devices plugged into the PC, compact disc memory (CD-ROM) and the like, as well as wired connections to other computer devices via joint test action group (JTAG) connections and the like. In either case, user PC 102 (or any suitable user device) alone or in conjunction with other computer devices may install the software application which includes the timer stored in the same memory section as the library code.

Figure 2:
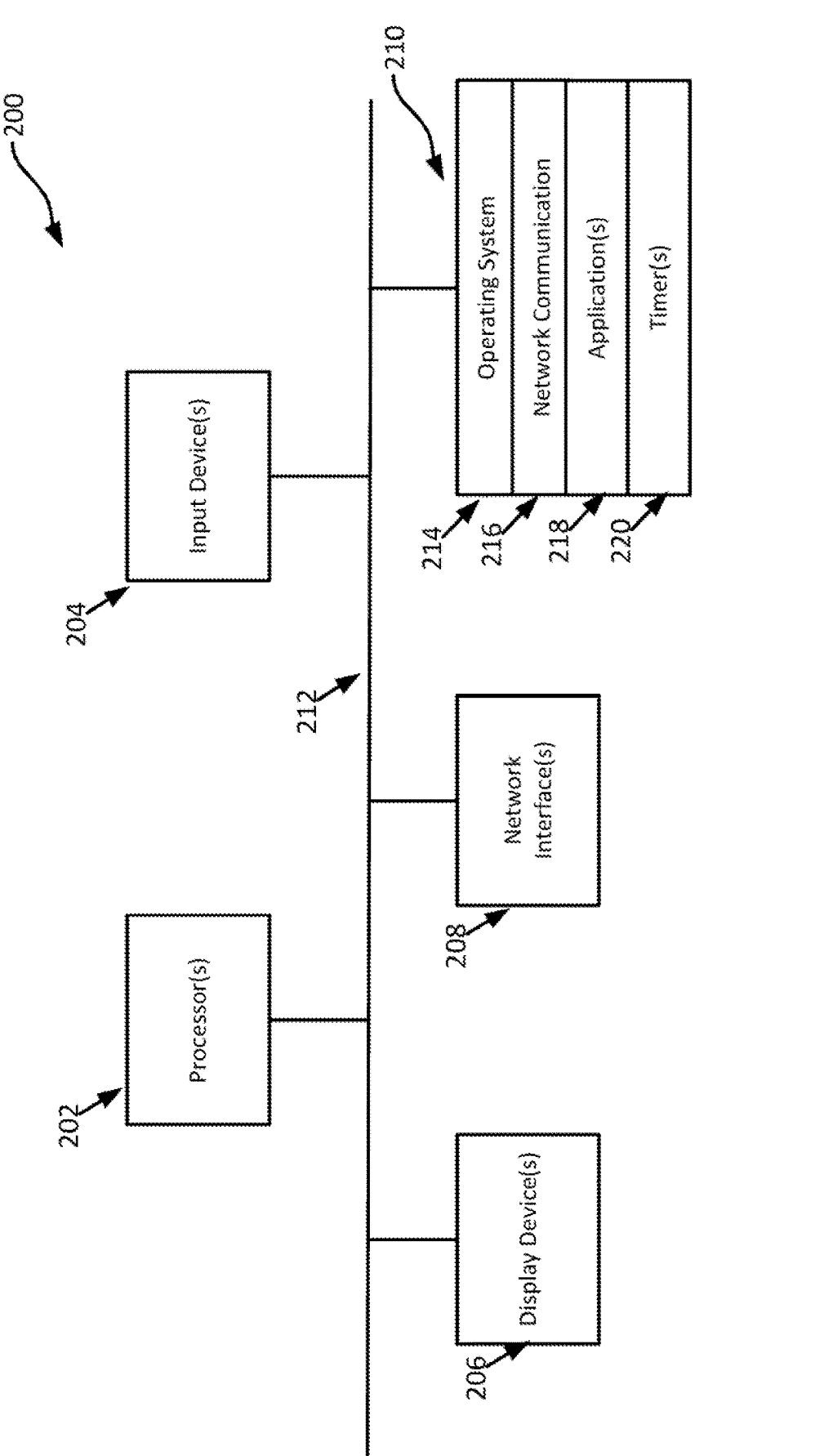
FIG. 2 shows an illustration of a computer device diagram of the system, according to an example embodiment of the present disclosure.

FIG. 2 shows a block diagram of an example computing device 200 that is configured for facilitating software application downloading, installation and operation based on the principles disclosed herein. For example, computing device 200 may function as server 106 and/or user device 102, or a portion or combination thereof in some embodiments. Computing device 200 performs one or more steps of the methods described herein. Computing device 200 is implemented on any electronic device that runs software applications derived from compiled instructions. In some implementations, the computing device 200 includes one or more processors 202, one or more input devices 204, one or more display devices 206, one or more network interfaces 208, and one or more computer-readable media 210. Each of these components is coupled to one another, for example, by a bus 212.

Display device 206 includes any display technology, including but not limited to display devices using Liquid Crystal Display (LCD) or Light Emitting Diode (LED) technology. Processor(s) 202 uses any processor technology, including but not limited to graphics processors and multi-core processors. Input device 204 includes any known input device technology, including but not limited to a keyboard (including a virtual keyboard), mouse, track ball, and touch-sensitive pad or display. Bus 212 includes any internal or external bus technology, including but not limited to ISA, EISA, PCI, PCI Express, USB, Serial ATA or FireWire. Computer-readable medium 210 includes any non-transitory computer readable medium that provides instructions to processor(s) 202 for execution, including without limitation, non-volatile storage media or volatile media.

Computer-readable medium 210 includes various instructions 214 for implementing an operating system (e.g., Mac OS®, Windows®, Linux). The operating system may be multi-user, multiprocessing, multitasking, multithreading, real-time, and the like. Network communications instructions 216 establish and maintain network connections. Application(s) 218 may comprise an application that uses or implements the processes described herein and/or other processes, while timer(s) 220 control the life duration of Application(s) 218. As mentioned above, library code of application(s) 218 and time code of timer(s) 220 are store in the same section of memory (e.g., same sector of flash memory) such that one cannot be modified without destroying the other.

As mentioned above, the timer sets a permitted duration that user device 102 is able to execute the software application or a portion (i.e., feature) of the software application. Examples of the timer installation and the timer operation are described with respect to FIGS. 3-6 below.

Software developers may generally create software applications and installation instructions that are compiled and ready to install in user devices. As mentioned above, a goal of the software developer is to install the timer code in the same section of memory as the library code. Typical software compilers do not install library code with other non-library code such as a software timer. Thus, in order to accomplish the desired storage configuration of the code, the software developer may have to modify their compiler to ensure that this common memory designation is made. Once the compiler is modified, the compilation process can commence in order to translate the software code to a lower-level code (e.g., machine code) for installation on the user device.

As mentioned above, the compiled code is to be installed in a manner such that the library code is stored in the same section of memory as the timer code. For example, when utilizing Flash memory, the library code is to be stored in the same "sector" of flash memory as the timer code. Each "sector" in Flash memory is the smallest section of memory (e.g., 4 KB) that can be erased and modified. Before new data can be written to flash memory, the existing data must be erased. In other words, one cannot erase or modify a portion of a sector without erasing the code in the entire sector. The exception to this is that data bits in the sector may be toggled to logic 0 without destroying the data in the entire sector. This is exception is how the timer operates and is described in more detail below.

Figure 3:
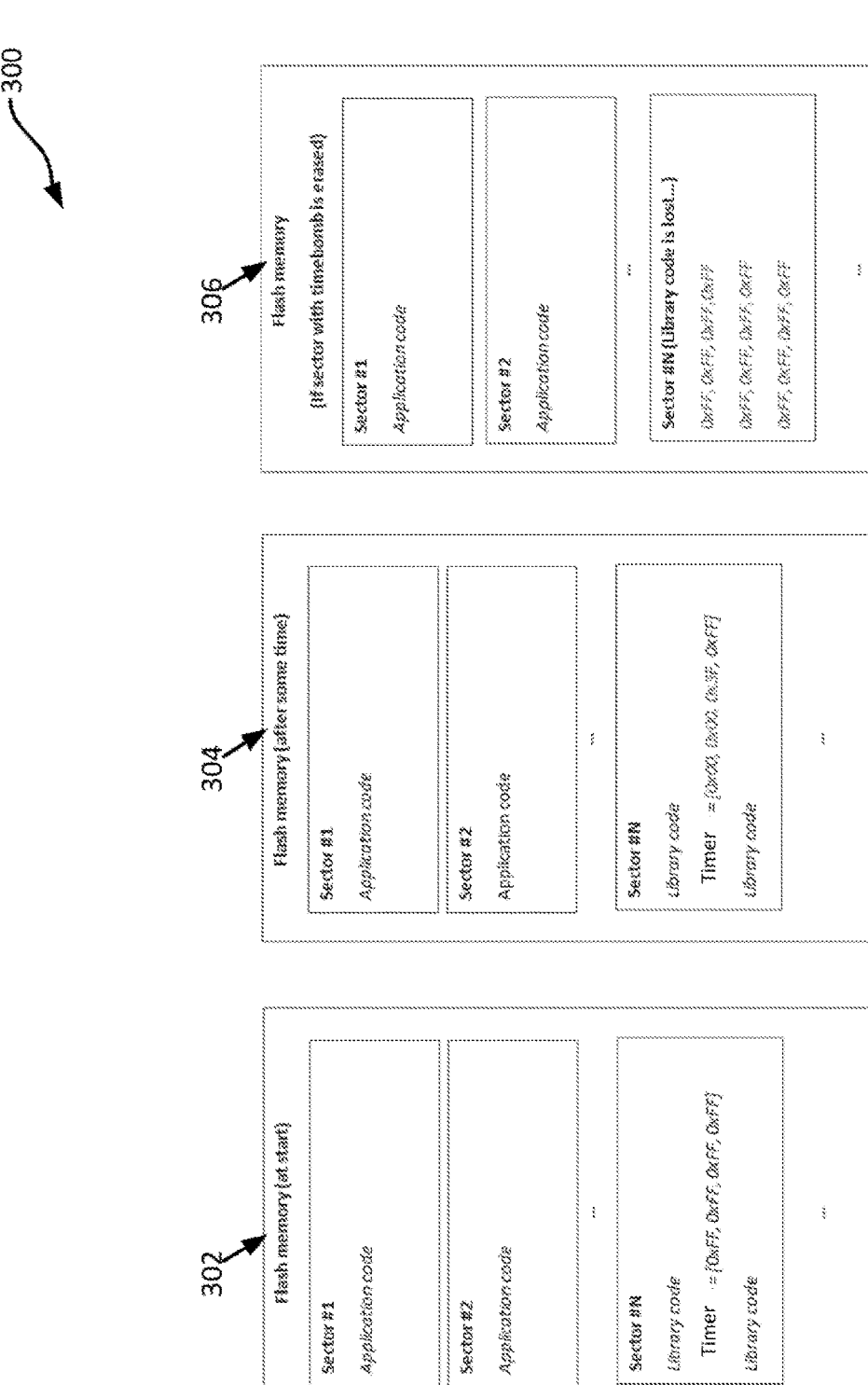
FIG. 3 shows an illustration of flash memory as the timer decrements, according to an example embodiment of the present disclosure.

FIG. 3 shows an illustration 300 of flash memory as the timer decrements, according to an example embodiment of the present disclosure. FIG. 3 shows the state of N sectors of flash memory at three different points in time. These states are shown as states 302, 304 and 306. In state 302, the application code is installed and stored in various sectors (e.g., sector 1, sector 2, etc.) of memory, while library code that supports the application code is also stored in various sectors (e.g., sector N) of memory. In addition to the library code, sector N also includes the timer code.

The timer code may be a predetermined number of bits that are initially set to logic 1 and then are toggled from logic 1 to logic 0 as the user utilizes the library code. This toggling behavior effectively decrements the counter from all ones to eventually all zeros when the timer expires. The frequency (i.e., rate) of decrementing the timer (i.e., toggling the bits) may be set based in part on the clock speed of the processor. A goal in designing the timer may be to minimize the number of bits needed for the timer while also ensuring that the timer is able to decrement fast enough that the user is not able use the library code before the decrementing is performed. For example, the decrementing rate may on the order of seconds.

The timer code in state 302 is the initialized timer with all bits set at logic 1. At a later time shown in state 304, the first two timer bits are shown to have been toggled from logic 1 to logic 0 due to the timer decrementing. In one example, this may represent that the user has used the library code for 2 seconds, 2 minutes, etc. When the user is not using the library code, the timer does not decrement, but rather maintains its previous state. During normal operation, as the user utilizes the software application and therefore utilizes the library code, the timer code continues to decrement until all bits are toggled from logic 1 to logic 0 as shown in 306, at which point the software application prevents the user from utilizing the software application. This expiration of the timer may be accompanied by an alert to the user.

During the life of the timer, a bad actor (e.g., the end user) may attempt to reset the timer code to gain extra usage of the software beyond the permitted timer duration. In order to accomplish this, the end user may attempt to toggle the timer bits back from logic 0 back to logic 1. However, as mentioned above, since a sector is the smallest section of flash memory that can be erased and written to, when the user attempts to write to a portion of the sector, the entire sector is erased. In other words, all of the code (including the library code) is reset to logic 1 when the user attempts to toggle the expired timer bits back to logic 1. This effectively destroys the library code. Therefore, even though the end user may be ultimately successful in resetting the timer code, they will have destroyed the library code in the process and therefore will not be able to execute the application. For example, after resetting the sector, the end user may request to execute the software application. The software application may think the timer has not expired, but upon retrieving the library code from memory the system returns an error because the library code has been reset to logic 1. An alert can then be displayed to the end user and/or to the software developer noting that the library has been compromised and that the application cannot be executed.

FIG. 4 shows an illustration of a flowchart for creating the timer, according to an example embodiment of the present disclosure. As mentioned above, the timer is essentially a sequence of logic 1 bits that are toggled to logic 0 as the user utilizes the library code. This sequence of logic 1 bits and corresponding code for toggling the bits over time are written to the same section of memory as the library code. This process is described in flowchart 400 in FIG. 4 with respect to an interaction between a software server and a user device. For example, in step 402, the server 106 receives a request from a user device 102 via network 110 to download and install a desired software application. In step 404 the server 106 determines an appropriate permitted duration of the timer based on various factors that may include but are not limited to the type of application requested, the identity of the end user, the type of user device, and an agreed upon period (e.g., trial period, license period, etc.). In step 406, the server 106 inserts timer instructions (e.g., duration, location of the timer in memory, identity of the library that the timer is stored with, etc.) into the application installation files. In general, the timer instructions ensure that the timer is stored in a memory section with a critical library that causes the software application to fail if the library is reset. These instructions may then be compiled and sent to the user device 102 in step 408.

FIG. 5 shows an illustration of a flowchart 500 for installing the timer, according to an example embodiment of the present disclosure. In step 502, the user device 102 downloads and receives the application installation files from the server 106 via network 110. User device 102 then executes the provided installer program in step 504 which installs the software application. In addition to installing the software application, the installer inserts the timer in the section of memory (e.g., sector of flash memory) of the user device along with a selected portion of the library code in step 506. Essentially the installer installs two different types of data including library code and non-library code (i.e., the timer code) in the same sector of memory. Once installed, the end user is able to execute the software application in step 508.

Once installed and executing, the software allows the user device to execute the library code. During use of the library code, the software decrements the timer stored alongside the library code until the timer expires. FIG. 6 shows an illustration of a flowchart 600 for decrementing the timer, according to an example embodiment of the present disclosure. For example, in step 602, after installation, the end user executes the software application. In step 604, the system determines if the library is in use. This determination may be made by logic stored in the sector along with the library code and timer code, or the logic may be stored in another sector of memory. The application may determine that the library is in use based on program instructions to start executing the library code and program instructions to end execution of the library code. These instructions may be made in response to requests from the end user to open the software application or to execute as certain feature of the software application. In another example, these instructions may be triggered by the user device accessing the memory sector storing the timer code.

In either case, the timer is decremented in step 606. The rate at which the timer is decremented (i.e., rate at which timer bits are sequentially toggled to logic 0) and the number of bits in the timer code are dictated by the desired permitted timer duration. For example, if the desired duration of allowed usage is 1 hour, the number of timer bits may be 3600 and the timer decrement rate may be one bit per second as the user device is accessing the library code. In step 608, the software application determines if the timer is expired or not (i.e., if all the timer bits have been toggled to logic 0). If the timer is not expired the software application continues to execute and decrement the counter. If however the timer is expired, in step 610 the software application prevents the user device from executing the application or a feature of the application. Notifications of expiration of the timer may be displayed to the end user and to the software developer. For example, if the timer governs a trial period for using the software application, a notification may be displayed on the user device notifying the end user that the trial period has expired and that a license will have to be purchased to continue using the software. If the end user agrees to the licensing terms, the timer can be reset by the software developer for the term of the license or the timer may be removed completely when the software updates are installed.

It is noted that although FIGS. 4-6 describe the creation, installation and operation of a timer with respect to the interaction between and user device and a software server, a similar process is executed even when a server is not utilized for installation (e.g., when the application is installed via a non-transitory computer readable medium). For example, the timer creation process, timer installation process, and the timer operation may be performed when the software is installed locally from a CD-ROM, etc.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method performed by a processor of a user device, the method comprising:

receiving, by the processor of the user device, instructions for installing application software on the user device;

installing the application software on the user device based on the instructions, the installation including:

installing library code of the application software in a sector of a flash memory device of the user device, and installing timer code in the sector of the flash memory device along with the library code, wherein erasure of the timer code from the sector of the flash memory device causes erasure of the library code from the sector of the flash memory device; and decrementing, by the processor of the user device, the timer code when the processor executes the library code, the timer code limiting a life duration of the user device executing the application software.

2. The method of claim 1, further comprising:

decrementing, by the processor of the user device, the timer code by toggling one or more bits in the timer code when the processor executes the library code.

3. The method of claim 1, further comprising:

decrementing, by the processor of the user device, the timer code each time that the processor executes the library code.

4. The method of claim 1, further comprising:

decrementing, by the processor of the user device, the timer code in accordance with a duration of time that the processor executes the library code.

5. The method of claim 1, further comprising:

decrementing, by the processor of the user device, the timer code at a predetermined frequency when the processor executes the library code.

6. The method of claim 1, further comprising:

decrementing, by the processor of the user device, the timer code until the timer code expires; and preventing, by the processor of the user device, execution of the application software when the timer code expires.

7. The method of claim 1, further comprising:

executing, by the processor of the user device, the library code for a predetermined duration of time defined by the timer code.

8. The method of claim 1, further comprising:

executing, by the processor of the user device, the library code for a trial period of the application software defined by the timer code.

9. The method of claim 1, further comprising:

erasing, by the processor of the user device, the timer code; and preventing, by the processor of the user device, execution of the application software due to the erasing of the timer code.

10. A method performed by a processor of an application software device, the method comprising:

creating, by the processor of the application software device, instructions for installing application software on a user device, the instructions instructing the user device to:

install library code of the application software in a sector of a flash memory device of the user device, install timer code in the sector of the flash memory device along with the library code, wherein erasure of the timer code from the sector of the flash memory device causes erasure of the library code from the sector of the flash memory device, and decrement the timer code when the user device executes the library code, the timer code limiting a life duration of the user device executing the application software; and providing the instructions to the user device for facilitating installation of the application software on the user device.

11. The method of claim 10, further comprising:

creating, by the processor of the application software device, the instructions to instruct the user device to decrement the timer code by toggling one or more bits in the timer code when the user device executes the library code.

12. The method of claim 10, further comprising:

creating, by the processor of the application software device, the instructions to instruct the user device to decrement the timer code each time that the user device executes the library code.

13. The method of claim 10, further comprising:

creating, by the processor of the application software device, the instructions to instruct the user device to decrement the timer code in accordance with a duration of time that the user device executes the library code.

14. The method of claim 10, further comprising:

creating, by the processor of the application software device, the instructions to instruct the user device to decrement the timer code at a predetermined frequency when the user device executes the library code.

15. The method of claim 10, further comprising:

creating, by the processor of the application software device, the instructions to instruct the user device to:
    decrement the timer code until the timer code expires, and
    prevent execution of the application software when the timer code expires.

16. The method of claim 10, further comprising:

creating, by the processor of the application software device, the instructions to instruct the user device to execute the library code for a predetermined duration of time defined by the timer code.

17. The method of claim 10, further comprising:

creating, by the processor of the application software device, the instructions to instruct the user device to execute the library code for a trial period of the application software defined by the timer code.

18. The method of claim 10, further comprising:

creating, by the processor of the application software device, the instructions to instruct the user device to prevent execution of the application software in response to erasing the timer code.

* * * * *